United States Patent
Chaney

(10) Patent No.: US 12,376,529 B2
(45) Date of Patent: Aug. 5, 2025

(54) BALER IMPLEMENT WITH TWINE DELIVERY SYSTEM

(71) Applicant: DEERE & COMPANY, Moline, IL (US)

(72) Inventor: Nathan A. Chaney, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 635 days.

(21) Appl. No.: 17/816,459

(22) Filed: Aug. 1, 2022

(65) Prior Publication Data

US 2024/0032478 A1    Feb. 1, 2024

(51) Int. Cl.
*A01F 15/14*   (2006.01)
*A01F 15/04*   (2006.01)
*B65B 13/26*   (2006.01)

(52) U.S. Cl.
CPC ............ *A01F 15/145* (2013.01); *B65B 13/26* (2013.01); *A01F 15/042* (2013.01)

(58) Field of Classification Search
CPC ...... A01F 15/145; A01F 15/042; A01F 15/12; B65B 13/22; B65B 13/26
See application file for complete search history.

(56) References Cited

U.S. PATENT DOCUMENTS

| | | | |
|---|---|---|---|
| 2,605,060 A | 7/1952 | George et al. | |
| 5,009,154 A | 4/1991 | Boes | |
| 9,402,349 B2 * | 8/2016 | Chaney | .................... G01B 7/00 |
| 2020/0178470 A1 * | 6/2020 | Brown, Jr. | ............ A01F 15/145 |

FOREIGN PATENT DOCUMENTS

| | | | | |
|---|---|---|---|---|
| EP | 3323603 A1 | 5/2018 | | |
| EP | 3590327 A1 * | 1/2020 | ........... | A01F 15/145 |

OTHER PUBLICATIONS

Extended European Search Report and Written Opinion issued in European Patent Application No. 23184829.2, dated Dec. 15, 2023, in 08 pages.

* cited by examiner

*Primary Examiner* — Jimmy T Nguyen

(57) ABSTRACT

A baler implement includes a first plate defining a first aperture for receiving a twine from a supply of the twine. A second plate defines a second aperture for discharging the twine to a knotter system. An elongated tube includes a first end defining a first opening, a second end defining a second opening, and defines an elongated interior passage extending between the first end and the second end. The first end of the elongated tube is positioned to align the first opening of the elongated tube with the first aperture of the first plate. The second end of the elongated tube is positioned to align the second opening of the elongated tube with the second aperture of the second plate. The elongated tube is shaped to guide the twine through the elongated interior passage thereof between the first aperture and the second aperture.

10 Claims, 5 Drawing Sheets

BALER IMPLEMENT WITH TWINE DELIVERY SYSTEM

TECHNICAL FIELD

The disclosure generally relates to a baler implement having a twine supply and a knotter system for wrapping a bale with twine.

BACKGROUND

A baler implement is operable to gather, compress, and shape crop material into a bale. The baler implement may be configured to create a bale having a parallelepiped or rectangular shape, often referred to as a square bale. Alternatively, the baler implement may be configured to create a bale having a cylindrical shape, often referred to as a round bale. The baler implement may gather the crop material from a ground surface and inject or feed the crop material into a baling chamber. The baler implement may then compress the crop material within the baling chamber to form the shape of the bale.

Once the bale is formed, the baler implement may wrap and secure the bale with twine using a knotter system. The knotter system wraps the twine around a perimeter or circumference of the bale and ties a knot in the twine to secure the bale. The knotter system may draw the twine from a supply location, e.g., a twine supply box. The twine may be drawn through a series of apertures and/or openings that guide and/or redirect the twine between the twine supply box and the knotter system. The passage of the twine through the series of apertures may introduce a variability into the tension of the twine, i.e., may cause the tension of the twine to vary. This variability in the tension of the twine may in turn negatively affect the performance of the knotter system. Additionally, the twine is exposed to debris while moving between the twine supply and the knotter system. Moving debris may contact the twine, thereby interfering with movement of the twine.

SUMMARY

A baler implement is provided. The baler implement includes a bale forming system including a baling chamber operable to form crop material into a bale. A knotter system is operable to wrap twine around a perimeter of the bale. A first plate defines a first aperture, and is operable to receive the twine from a supply of the twine. A second plate defines a second aperture, and is operable to discharge the twine to the knotter system. An elongated tube includes a first end defining a first opening, and a second end defining a second opening. The elongated tube defines an elongated interior passage extending between the first end and the second end of the elongated tube. The first end of the elongated tube is positioned to align the first opening of the elongated tube with the first aperture of the first plate. The second end of the elongated tube is positioned to align the second opening of the elongated tube with the second aperture of the second plate. The elongated tube is shaped to guide the twine through the elongated interior passage thereof between the first aperture and the second aperture.

In one aspect of the disclosure, the baler implement may further include a twine storage box that is configured for containing the supply of the twine. The first plate and the second plate may be positioned between the twine storage box and the knotter system, along a path of movement of the twine between the supply of the twine and the knotter system. In one implementation, the twine storage box includes a wall defining the first plate. In another implementation, the first plate is separate from the twine storage box, yet positioned proximate and/or immediately adjacent the twine storage box. In another implementation, the first plate is spaced from the twine storage box.

In one aspect of the disclosure, the knotter system may include a main gear tensioner that is operable to control a tension of the twine to a desired tension value. In one implementation of the disclosure, the second plate may be positioned proximate and/or immediately adjacent to the knotter system. For example, the second plate may be positioned proximate and/or immediately adjacent to a main gear tensioner to discharge the twine into the main gear tensioner. In another implementation, the second plate may be spaced from the knotter system.

In one implementation of the disclosure, the elongated tube may be flexible along a central longitudinal axis of the elongated tube, and exhibit a geometric stability, i.e., generally inflexible, along a cross section of the elongated tube that is perpendicular to the central longitudinal axis. In other words, the elongated tube may be generally flexible along a longitudinal length of the elongated tube, while maintaining the structural cross-sectional shape of the elongated interior passage perpendicular to the central longitudinal axis. In another implementation of the disclosure, the elongated tube may be rigid and substantially inflexible along both the longitudinal length of the elongated tube and along the cross section of the elongated tube perpendicular to the central longitudinal axis.

In one aspect of the disclosure, the elongated tube may include and be manufactured from one of a plastic, a metal, or a polymer. For example, the elongated tube may be manufactured from a metal, such as but not limited to steel, steel alloy, aluminum, or aluminum alloy. In other examples, the elongated tube may be manufactured from a polymer such as but not limited to a cross linked polyethylene (PEX).

In one aspect of the disclosure, the first end of the elongated tube may be attached to the first plate, and the second end of the elongated tube may be attached to the second plate. The elongated tube may be attached to the first plate and/or the second plate via a mechanical connector, a retaining flange, etc.

In one aspect of the disclosure, the elongated tube may include a non-perforated wall forming the elongated interior passage, thereby providing a continuous, smooth, low friction surface against which the twine rides against. Additionally, the non-perforated wall prevents debris from entering the elongated interior passage of the elongated tube.

Accordingly, the elongated tube may guide the twine between the first plate and the second plate with a smooth transition around corners on a low friction surface. The elongated tube protects the twine from debris, while reducing the variability of the twine tension, thereby improving operational performance of the knotter system.

The above features and advantages and other features and advantages of the present teachings are readily apparent from the following detailed description of the best modes for carrying out the teachings when taken in connection with the accompanying drawings.

DETAILED DESCRIPTION

Figure 1:
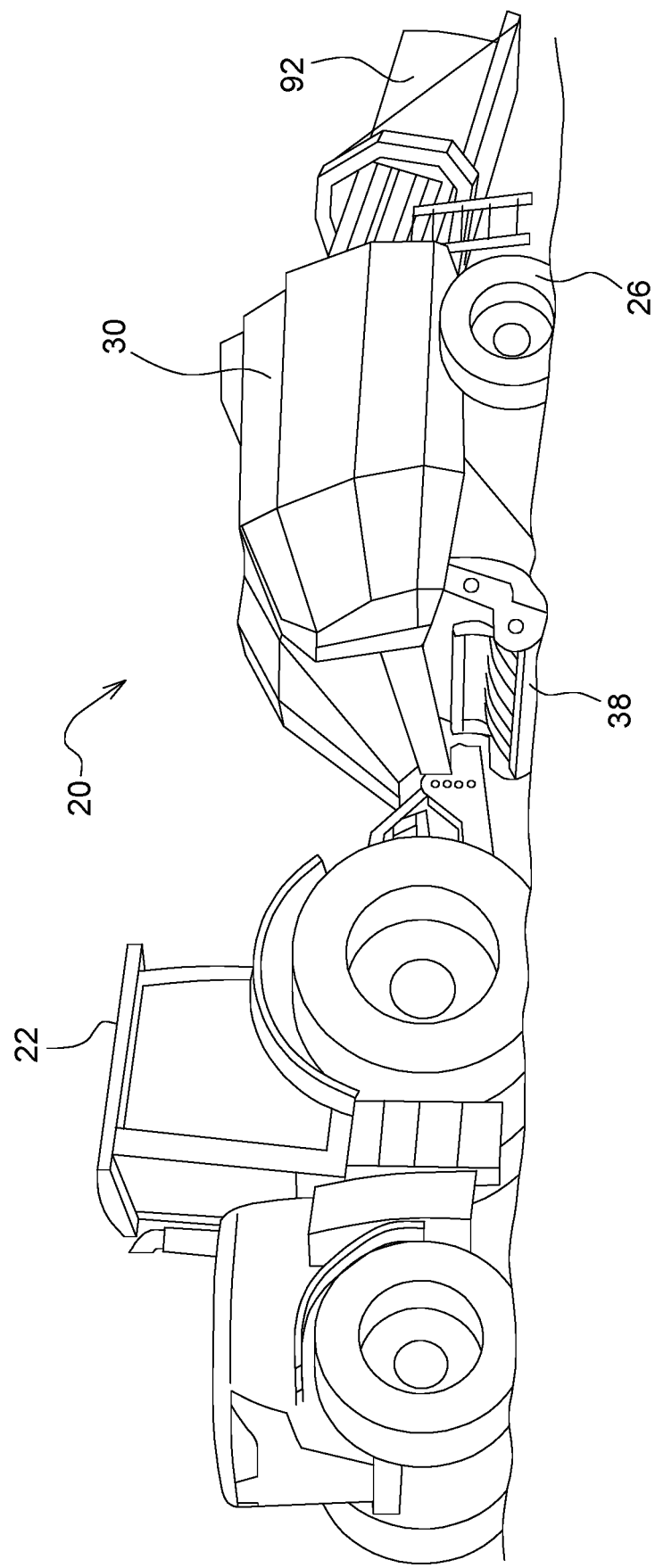
FIG. 1 is a schematic perspective view of a traction unit pulling a baler implement.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a baler implement is generally shown at 20. The baler implement 20, such as shown in the Figures and described herein, may be configured to create a bale having a parallelepiped or rectangular shape, often referred to as a square bale, e.g., a large square baler or a small square bailer. Alternatively, in other implementations, the baler implement 20 may be configured to create a bale having a cylindrical shape, often referred to as a round bale. While the example implementation of the baler implement 20 described herein is embodied as a large square baler configured to produce a bale having a parallelepiped shape, it should be appreciated that the teachings of this disclosure may be applied to other baler platforms, such as a round baler, and are not limited to the example implementation of the large square baler shown in the Figures and described herein.

As shown in FIG. 1, a traction unit 22 or vehicle, such as but not limited to a tractor, is coupled to the baler implement 20 for pulling and powering the baler implement 20. However, it should be appreciated that in other embodiments, the baler implement 20 may be self-propelled, in which case the traction unit 22 and the baler implement 20 are configured as a single, self-propelled vehicle.

As depicted in FIG. 1, the baler implement 20 may move across a field and gather and process crop material to form a bale 92. The baler implement 20 may then eject the formed bale from the rear of the baler implement 20.

Figure 2:
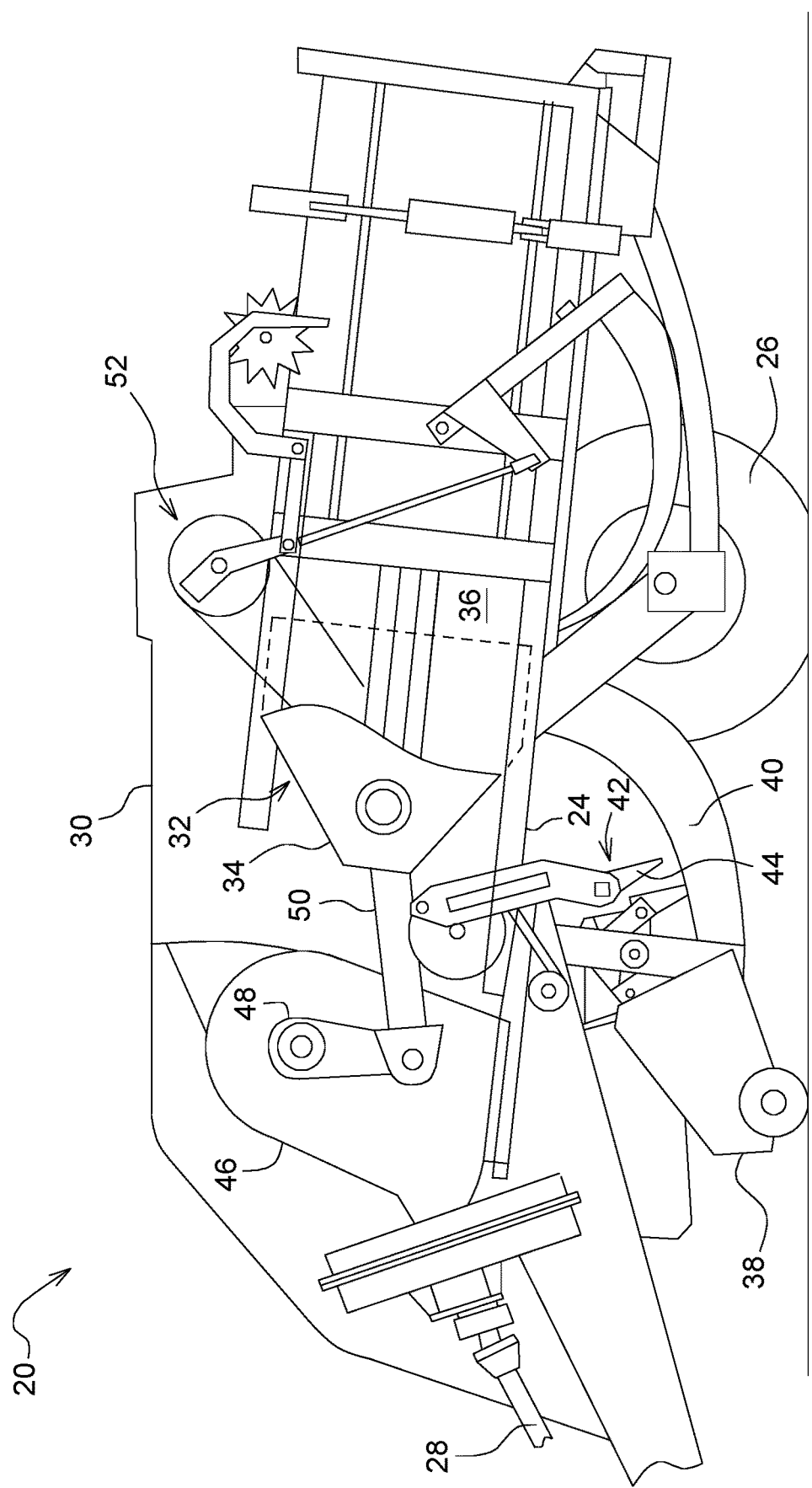
FIG. 2 is a schematic cross-sectional side view of the baler implement.

Referring to FIG. 2, the exemplary implementation of the baler implement 20 includes a frame 24, ground engaging devices 26, such as but not limited to wheels and/or tracks, and an input shaft 28, such as a power-take-off (PTO) shaft, which can receive rotational power from a power source, such as the traction unit 22.

The baler implement 20 includes a housing 30 or body, which generally shields various internal components of the baler implement 20. The housing 30 is attached to and supported by the frame 24. The baler implement 20 includes a bale forming system 32. The bale forming system 32 is operable to form the gathered crop into a shape defining the bale. In the example implementation described herein, the bale forming system 32 includes a plunger 34 moveable in a reciprocating motion within a baling chamber 36. The plunger 34 compresses the crop material within the baling chamber 36 to form crop material into the bale. The housing 30 includes multiple wall sections or panels that form and/or define the baling chamber 36. The baling chamber 36 may alternatively be referred to as a compression chamber for forming the bale 92.

The baler implement 20 includes a pick-up mechanism 38. The pick-up mechanism 38 is disposed proximate the forward end of the frame 24. The pick-up mechanism 38 gathers crop material from the ground surface and directs the gathered crop material toward and into an inlet of the baling chamber 36 of the baler implement 20. The pickup may include, but is not limited to tines, forks 44, augers, conveyors, baffles, etc., for gathering and moving the crop material. The baler implement 20 may be equipped with a pre-cutter, disposed between the pickup and the inlet. As such, the pre-cutter is disposed downstream of the pickup and upstream of the inlet relative to a direction of travel of the crop material. The pre-cutter cuts or chops the crop material into smaller pieces.

The pick-up mechanism 38 directs the gathered crop material into a pre-compression passageway 40, which stores a volume of gathered crop material. A feeder system 42 includes a plurality of forks 44, which are timed to move the crop material from the pre-compression passageway 40 into the baling chamber 36.

The input shaft 28 or PTO shaft is connected to an input of a transmission 46 to provide rotational power to the baler implement 20 from the traction unit 22 or other associated vehicle or power source. The transmission 46 includes a gearbox which converts the rotational motion of the input shaft 28 along a generally longitudinal axis of the baler implement 20 to an output of the transmission 46 having a rotational motion along a generally transverse axis of the baler implement 20.

The baler implement 20 includes a crank arm 48 connected to the output of the transmission 46. A connecting link 50 interconnects the crank arm 48 and the plunger 34. The crank arm 48 rotates based upon the output of the transmission 46 and the plunger 34 moves in a reciprocal motion within the compression chamber as the crank arm 48 rotates. The plunger 34 extends into the compression chamber, thereby compressing the crop material, and then at least partially retracts from the compression chamber, at which time the feeder system 42 moves more crop material into the baling chamber 36, i.e., compression chamber.

When the bale is formed within the baling chamber 36, a knotter system 52 wraps a plurality of strands 54 of twine around the bale to secure the shape of the bale. When the baler implement 20 is configured as the large square baler, such as described herein, the knotter system 52 wraps the strands 54 of twine around a longitudinal perimeter or extent, i.e., the longest length of the bale, with each individual strand 54 of twine encircling the bale. The knotter system 52 ties each end of each respective strand 54 of twine together to form a knot, securing each respective strand 54 of twine in place.

The operation of the baler implement 20 and the components thereof related to the pick-up mechanism 38 for gathering the crop material, the feeder system 42 for feeding the crop material into the compression chamber, the plunger 34 for compressing the crop material to form the bale, and the knotter system 52 to wrap the bale with the strands 54 of twine and tie the strands 54 of twine in a knot to secure the shape of the bale are understood by those skilled in the art, are not pertinent to the teachings of this disclosure, and are therefore not described in greater detail herein.

In the example implementation shown in the figures and described herein, the completed bale 92 is pushed off a rearward end of the baler implement 20 by a subsequently formed bale, or otherwise discharged off the rearward end of the baler implement 20 by a powered roller or some other discharge mechanism, and whereby the bale is deposited on the ground surface.

Figure 3:
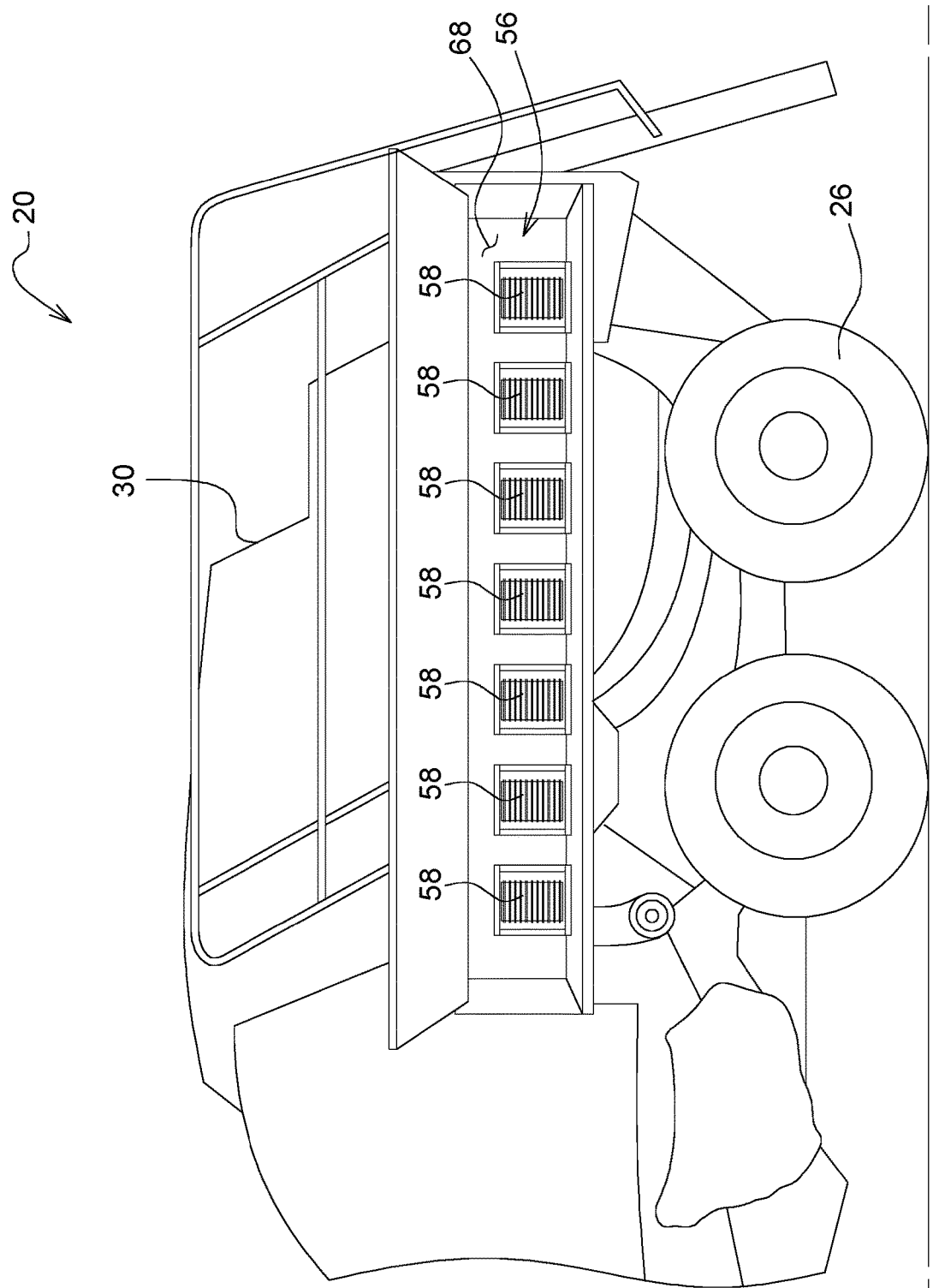
FIG. 3 is a schematic side view of the baler implement showing a twine supply box.
Figure 5:
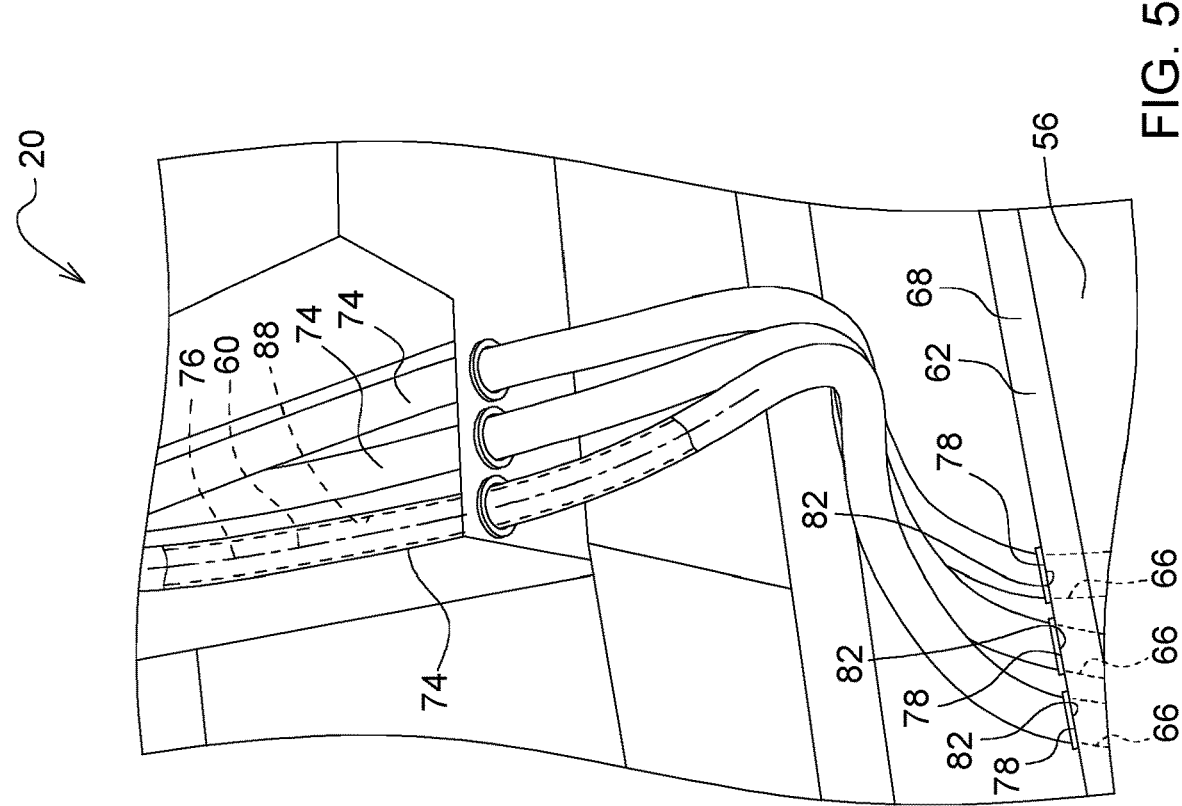
FIG. 5 is a schematic perspective view showing the elongated tube connected to a knotter system of the baler implement.
Figure 4:
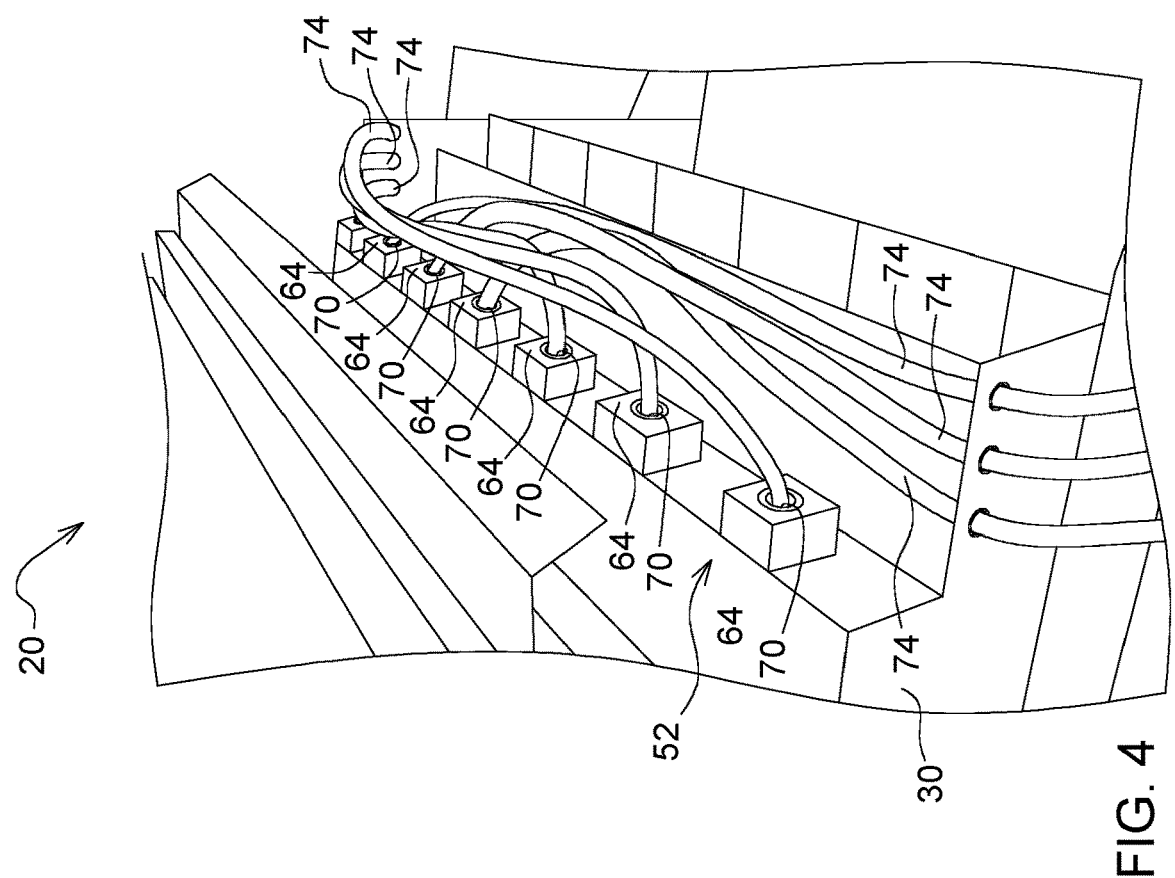
FIG. 4 is a schematic perspective view showing an elongated tube connected to the twine supply box of the baler implement.
Figure 6:
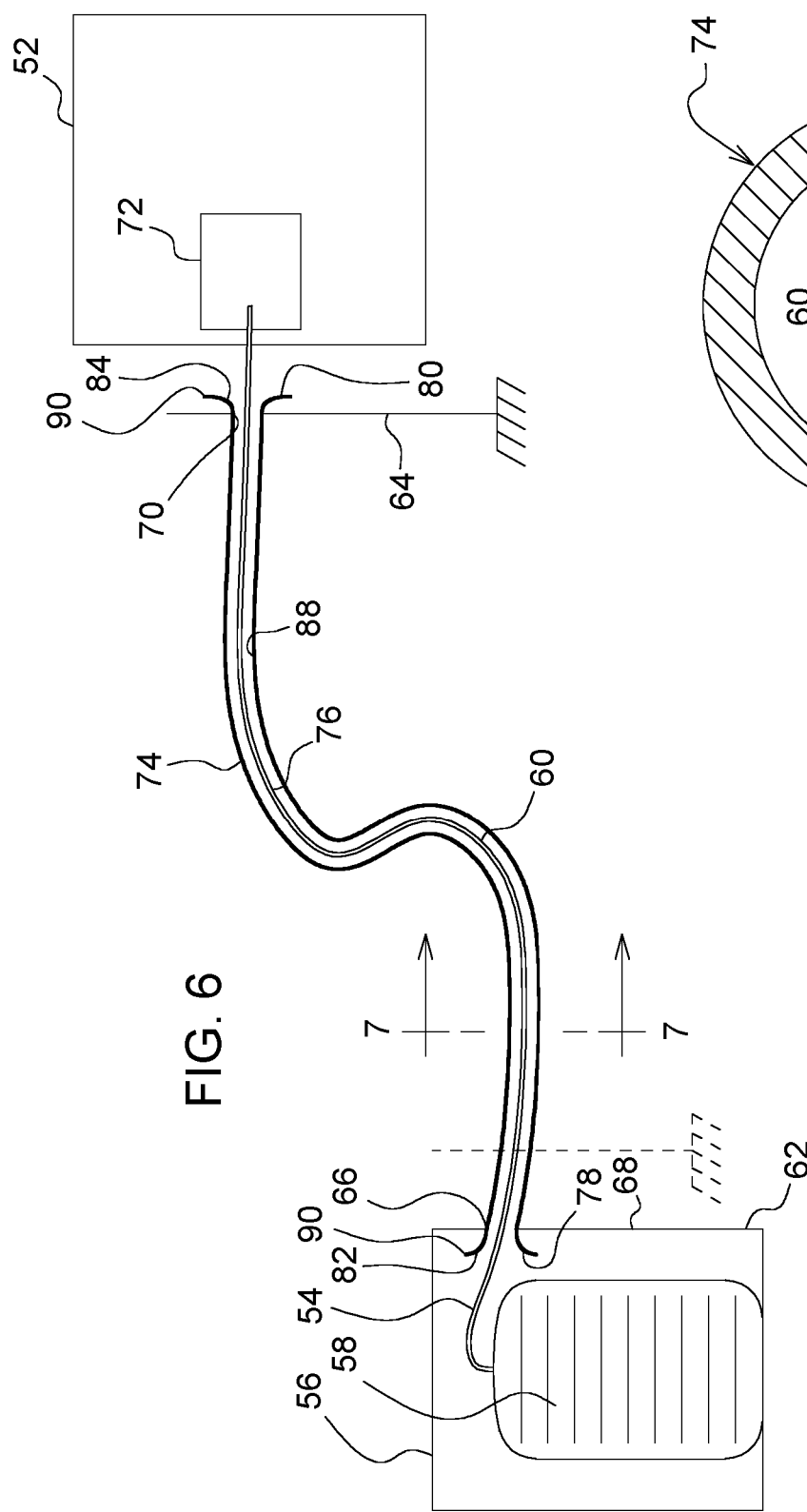
FIG. 6 is a schematic layout showing the elongated tube interconnecting the twine supply box and the knotter system.

Referring to FIG. 3, the baler implement 20 may include a supply location for the twine. For example, the bale implement may include a twine supply box 56, which is configured to contain one or more bundles 58 or balls of twine. Referring to FIGS. 4-6, the knotter system 52 may draw the twine from the twine supply box 56 along a path 60. The twine is routed or guided from the twine supply box 56 to the knotter system 52 along the path 60. The path 60 between the twine supply box 56 and an inlet to the knotter system 52 may be non-linear, such that the direction of the twine must be guided and/or rerouted around bends, turns, undulations, etc.

Referring to FIG. 6, the baler implement 20 includes a first plate 62 and a second plate 64. The first plate 62 defines a first aperture 66. The first plate 62, and more particularly the first aperture 66, are positioned and operable to receive the twine from the supply location, e.g., the twine supply box 56. As such, in one implementation, the first plate 62 and the first aperture 66 thereof may be positioned near and/or proximate the twine storage box. However, in other implementations, the first plate 62 and the first aperture 66 may be positioned a distance from the twine supply box 56.

The first plate 62 may include a structure that is attached to the frame 24, housing 30, or other component of the baler implement 20. In one example implementation, shown in solid lines in FIG. 6, the twine storage box may include a wall 68 defining the first plate 62. However, it should be appreciated that the first plate 62 may be defined by some other structure or component of the baler implement 20, other than the twine supply box 56, such as represented in phantom in FIG. 6.

The second plate 64 defines a second aperture 70. The second plate 64, and more particularly the second aperture 70, are positioned and operable to discharge the twine to the knotter system 52. As such, the second plate 64 and the second aperture 70 thereof may be positioned near and/or proximate the knotter system 52. In one example implementation, the knotter system 52 may include a main gear tensioner 72 for each respective strand 54 of twine. The main gear tensioner 72 is operable to control a tension of the strand 54 of twine to achieve a desired tension value. The second plate 64 may be positioned proximate and/or near the main gear tensioner 72 to discharge the twine into the main gear tensioner 72. However, in other implementations, the second plate 64 may be positioned a distance from the knotter system 52 and/or the main gear tensioner 72.

As described above, the twine travels from the twine supply box 56 to the knotter system 52 along the twine path 60. The first plate 62 is disposed between the twine supply box 56 and the second plate 64 along the twine path 60. The second plate 64 is disposed between the first plate 62 and the knotter system 52 along the twine path 60. While the example implementation described herein positions the first plate 62 adjacent or near the twine supply box 56, and the second plate 64 adjacent or near the knotter system 52, it should be appreciated that in other implementations, the first plate 62 may not be immediately adjacent to the twine supply box 56, or that the second plate 64 may not be immediately adjacent to the knotter system 52. As such, the first plate 62 and the second plate 64 may be disposed at intermediate locations along the path 60 of the twine.

The baler implement 20 includes an elongated tube 74. The elongated tube 74 extends along a central longitudinal axis 76 between a first end 78 of the elongated tube 74 and a second end 80 of the elongated tube 74. The first end 78 of the elongated tube 74 defines a first opening 82. The first end 78 of the elongated tube 74 is positioned to align the first opening 82 of the elongated tube 74 with the first aperture 66 of the first plate 62. The second end 80 of the elongated tube 74 defines a second opening 84. The second end 80 of the elongated tube 74 is positioned to align the second opening 84 of the elongated tube 74 with the second aperture 70 of the second plate 64.

The elongated tube 74 includes a wall 86 forming an elongated interior passage 88 that extends between the first end 78 and the second end 80 of the elongated tube 74. The elongated tube 74 is shaped to guide the twine through the elongated interior passage 88 thereof between the first aperture 66 of the first plate 62 and the second aperture 70 of the second plate 64. In one example implementation, the wall 86 is solid, i.e., non-perforated, thereby providing a smooth, consistent surface against which the twine moves or slides against. Additionally, the non-perforated wall 86 closes the elongated interior passage 88 to limit intrusion of dirt and debris into the elongated interior passage 88.

In one implementation, the first end 78 of the elongated tube 74 may be attached to the first plate 62. The first end 78 of the elongated tube 74 may be attached to the first plate 62 via a mechanical connector, a retaining flange, etc. In one implementation, the first end 78 may include a flared end 90 to define a dimension, e.g., a diameter, that is larger than the first aperture 66 of the first plate 62. The flared end 90 of the first end 78 is operable to secure the first end 78 of the elongated tube 74 relative to the first plate 62, and provides a smooth transition for the twine to enter the elongated interior passage 88.

In one implementation, the second end 80 of the elongated tube 74 may be attached to the second plate 64. The second end 80 of the elongated tube 74 may be attached to the second plate 64 via a mechanical connector, a retaining flange, etc. In one implementation, the second end 80 may include a flared end 90 to define a dimension, e.g., a diameter, that is larger than the second aperture 70 of the second plate 64. The flared end 90 of the second end 80 is operable to secure the second end 80 of the elongated tube 74 relative to the second plate 64, and provides a smooth transition for the twine to exit the elongated interior passage 88.

The elongated tube 74 may be manufactured from one of a plastic, a metal, a metal alloy, a polymer or combinations thereof. For example, the elongated tube 74 may be manufactured from a steel or steel alloy, aluminum or an aluminum alloy, a plastic such as cross linked polyethylene (PEX), or some other similar material.

Figure 7:
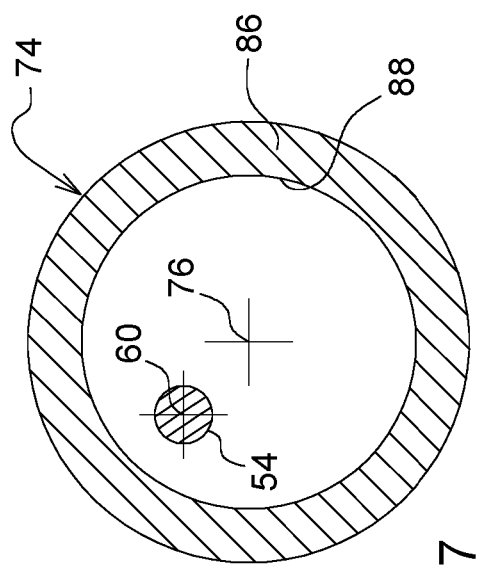
FIG. 7 is a schematic cross-sectional view of the elongated tube shown in FIG. 6.

In one implementation, the elongated tube 74 may be constructed to exhibit a degree of flexion. For example, using a material having properties of or similar to cross linked polyethylene, the elongated tube 74 may be manufactured to be flexible along the central longitudinal axis 76 of the elongated tube 74, while maintaining a geometric stability of a cross section (shown in FIG. 7) of the elongated tube 74 perpendicular to the central longitudinal axis 76. As used herein, "flexible" may be considered to include a degree of bending that permits the shaping of the elongated tube 74 sufficient to route and/or guide the twine within the elongated interior passage 88 between the first end 78 and the second end 80 of the elongated tube 74. As used herein, the term "geometric stability of a cross section of the elongated tube 74" may be interpreted to include substantially maintaining the cross sectional tubular structure of the elongated tube 74, i.e., resistant against closure or collapse.

In another implementation, the elongated tube 74 may be constructed to include a rigid structure that is substantially inflexible along both the central longitudinal axis 76 and across the cross section of the elongated tube 74 during normal operating forces. It should be appreciated that the elongated tube 74 may be formed during manufacture to include a desired shape defining the path 60 of the strands 54 of twine, and thereafter exhibit the substantially rigid property or characteristic of the material forming the elongated tube 74. For example, the elongated tube 74 may be constructed from a metal, such as a steel, steel alloy, aluminum, or aluminum alloy.

The elongated tube 74 smoothly guides the twine through the first aperture 66 of the first plate 62 and the second aperture 70 of the second plate 64, reducing frictional and/or drag forces acting on the twine, and precenting debris from contacting and/or disrupting movement of the twine. This reduces variability in the tension of the twine, which in turn improves the operation of the knotter system 52.

While the example implementation has been described above with reference to the first plate defining the first aperture and the second plate defining the second aperture, with the elongated tube extending between, it should be appreciated that the baler implement may include one or more additional plate structures disposed along the path of the twine between the first plate and the second plate, with each additional plate structure having a respective aperture through which the elongated tube and the twine pass through. These additional plate structures may operate to support the elongated tube and position the elongated tube on the path of the twine.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler implement comprising:
   a baling chamber operable to form crop material into a bale;
   a knotter system operable to wrap twine around a perimeter of the bale and tie a knot in the twine to secure the bale;
   a first plate defining a first aperture and operable to receive a strand of twine from a twine storage box containing a supply of twine;
   a second plate defining a second aperture and operable to discharge the strand of twine to the knotter system; and
   an elongated tube having a first end defining a first opening, a second end defining a second opening, and defining an elongated interior passage extending between the first end and the second end;
   wherein the first end of the elongated tube is positioned to align the first opening of the elongated tube with the first aperture of the first plate;
   wherein the second end of the elongated tube is positioned to align the second opening of the elongated tube with the second aperture of the second plate;
   wherein the elongated tube is shaped to guide the strand of twine through the elongated interior passage thereof between the first aperture and the second aperture;
   wherein the knotter system includes a main gear tensioner operable to control a tension of the strand of twine to a desired tension value; and
   wherein the second plate is positioned proximate the main gear tensioner to discharge the strand of twine into the main gear tensioner.

2. The baler implement set forth in claim 1, wherein the twine storage box includes a wall defining the first plate.

3. The baler implement set forth in claim 1, wherein the first plate is positioned proximate the twine storage box.

4. The baler implement set forth in claim 3, wherein the second plate is positioned proximate the knotter system.

5. The baler implement set forth in claim 1, wherein the elongated tube is flexible along a central longitudinal axis of the elongated tube, and wherein a cross section of the elongated tube perpendicular to the central longitudinal axis is geometrically stable.

6. The baler implement set forth in claim 1, wherein the elongated tube is rigid and substantially inflexible.

7. The baler implement set forth in claim 1, wherein the elongated tube is manufactured from one of a plastic, a metal, or a polymer.

8. The baler implement set forth in claim 1, wherein the first end of the elongated tube is attached to the first plate.

9. The baler implement set forth in claim 1, wherein the second end of the elongated tube is attached to the second plate.

10. The baler implement set forth in claim 1, wherein the elongated tube includes a non-perforated wall forming the elongated interior passage.

* * * * *